United States Patent
Pannell (10) Patent No.: US 8,635,374 B1
(45) Date of Patent: Jan. 21, 2014

(54) AUTOMATIC MEDIA CONVERTER

(75) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 3421 days.

(21) Appl. No.: 10/353,482

(22) Filed: Jan. 28, 2003

(51) Int. Cl.
*G06F 15/16* (2006.01)

(52) U.S. Cl.
USPC .................. 709/249; 709/248; 709/223

(58) Field of Classification Search
None
See application file for complete search history.

(56) References Cited

U.S. PATENT DOCUMENTS

| | | | | |
|---|---|---|---|---|
| 5,440,538 A | * | 8/1995 | Olsen | 370/228 |
| 5,574,938 A | * | 11/1996 | Bartow et al. | 709/235 |
| 5,966,664 A | * | 10/1999 | Hiramatsu et al. | 455/515 |
| 6,088,330 A | * | 7/2000 | Bruck et al. | 370/228 |
| 6,198,727 B1 | * | 3/2001 | Wakeley et al. | 370/247 |
| 6,209,035 B1 | * | 3/2001 | Terakita | 709/227 |
| 6,209,039 B1 | * | 3/2001 | Albright et al. | 709/227 |
| 7,023,873 B2 | * | 4/2006 | Gibson et al. | 370/445 |
| 7,200,115 B2 | * | 4/2007 | Khan et al. | 370/236 |

FOREIGN PATENT DOCUMENTS

WO WO 00/54419 9/2000

OTHER PUBLICATIONS

"Part.3: Carrier Sense Multiple Access with Collision Detection (CSMA/CD) Access Method and Physical Layer Specifications," *IEEE standard* 802.3, 2002.

* cited by examiner

*Primary Examiner* — Dhairya A Patel (57) ABSTRACT

An apparatus, method, and computer-readable media for controlling the link status of first and second data communication channels. The apparatus comprises a first physical layer device coupled to the first channel, the first physical layer device comprising a first register storing a first link status bit that indicates the link status of the first channel; and a second physical layer device coupled to the second channel, the second physical layer device comprising a second register storing a second link status bit that indicates the link status of the second channel; wherein the first and second physical layer devices are configured to pass data between the first and second channels; and a processor to (a) determine the link to status of the first channel; (b) when the link status of the first channel determined at (a) is link up, determine the link status of the second channel; and (c) when the link status of the second channel determined at (b) is link down, automatically force the link status of the first channel to link down.

68 Claims, 5 Drawing Sheets

AUTOMATIC MEDIA CONVERTER

BACKGROUND

The present invention relates generally to data communications, and particularly to conversion between different data communication channel media.

A data communication channel permits data communication between devices such as computers, switches, and the like. Data communication channels are available in different media to suit different applications. For example, copper media is often used for indoor channels due to low cost and ease of installation, while optical fiber is often used outdoors due to its immunity to electromagnetic disturbances such as lightning strikes, and due to its superior signal attenuation characteristics which support longer distances.

Figure 1:
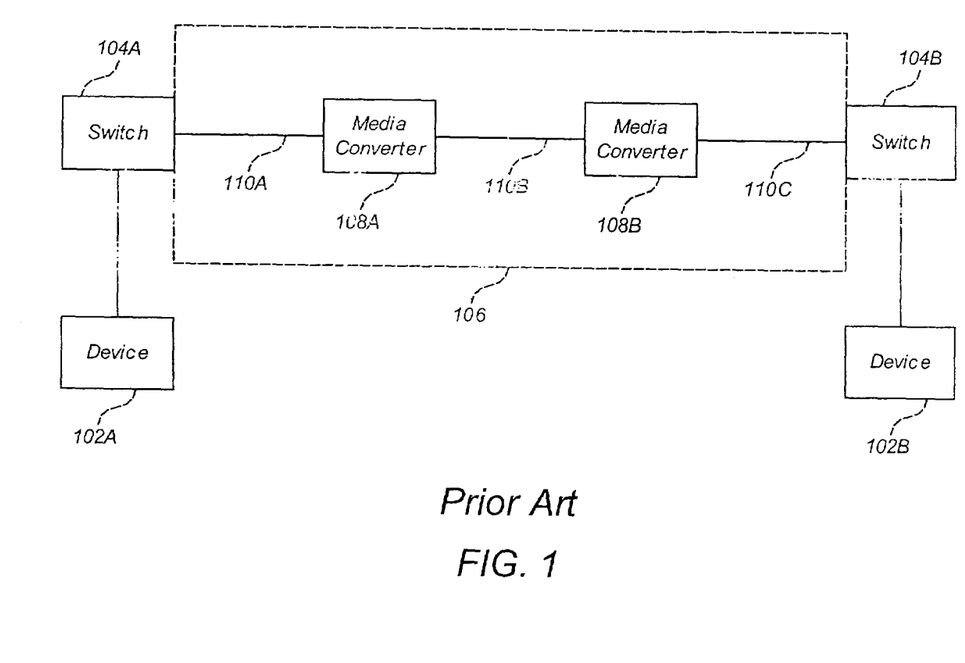
FIG. 1 shows a conventional media converter installation.

When it is necessary to connect channels of different media, a media converter is required. FIG. 1 shows a conventional installation. Two devices 102A and 102B are connected to two switches 104A and 104B, respectively. Switches 104 are connected by a channel 106 that includes a copper channel 110A, a fiber optic channel 110B, and a second copper channel 110C. Fiber optic channel 110B is connected to copper channels 110A and 110C by media converters 108A and 108B, respectively.

A common problem with the installation of FIG. 1 occurs when one of channels 110 goes down. For example, assume channel 110A goes down. Both switch 104A and media converter 108A detect this condition and therefore provide a "link down" indication. However, this information does not propagate across links 110B and 110C to converter 108B and switch 104B, which continue to provide a "link up" indication because the status of channel 110C is "link up." This "link down" propagation is important so that switch 104B can take appropriate action due to the link 106 being down. One form of appropriate action is to inform the network administrator of the problem or to reconfigure the network using a backup link to switch 104A. Non of this can be done without the propagation of the "link down" status.

One solution is to add sensors to channels 110A and 110C to detect "link down" status, and to propagate that status across channel 110B to the converter 108 and switch at the other end. One disadvantage of this approach is that such an arrangement renders channels 110A and 110B to be non-compliant with network standards such as those published be the Institute of Electrical and Electronics Engineers (IEEE).

Another disadvantage of this approach is the cumbersome process required to reestablish "link up" status. One approach is to provide a manual control on each switch 104 that forces "link up" when operated. One disadvantage of this approach is that human intervention is required. Either one person must travel to both switches 104, or two persons must coordinate the operation of the controls by some communication means other than channel 106.

SUMMARY

In general, in one aspect, the invention features a method and computer-readable media for controlling the link status of first and second data communication channels configured to exchange data through a media converter. It comprises (a) determining the link status of the first channel; (b) when the link status of the first channel determined in step (a) is link up, determining the link status of the second channel; and (c) when the link status of the second channel determined in step (b) is link down, automatically forcing the link status of the first channel to link down.

Particular implementations can include one or more of the following features.

Implementations comprise (d) when the link status of the second channel determined in step (b) is link up, determining the link status of the first channel; and (e) when the link status of the first channel determined in step (d) is link down, automatically forcing the link status of the second channel to link down. Implementations comprise (f) when the link status of the first channel determined in step (d) is link up, determining the link status of the second channel; and (g) when the link status of the second channel determined in step (f) is link down, automatically forcing the link status of the first channel to link down. Implementations comprise (h) when the link status of the second channel determined in step (f) is link up, returning to step (d). Implementations comprise (i) when the link status of the second channel determined in step (f) is link down, returning to step (a) after automatically forcing the link status of the first channel to link down. Implementations comprise (j) when the link status of the second channel determined in step (b) is link down, returning to step (a) after automatically forcing the link status of the first channel to link down. Implementations comprise (k) when the link status of the first channel determined in step (a) is link down, determining the link status of the second channel; (l) when the link status of the second channel determined in step (k) is link up, determining the link status of the first channel; and (m) when the link status of the first channel determined in step (l) is link down, automatically forcing the link status of the second channel to link down. (n) when the link status of the first channel determined in step (k) is link up and the link status of the second channel determined in step (b) is link up, determining the link status of the first channel; and (o) when the link status of the first channel determined in step (n) is link down, automatically forcing the link status of the second channel to link down. Implementations comprise (p) when the link status of the first channel determined in step (d) is link down, returning to step (a) after automatically forcing the link status of the second channel to link down. Implementations comprise (q) when the link status of the first channel determined in step (l) is link down, returning to step (a) after automatically forcing the link status of the second channel to link down. Implementations comprise (r) when the link status of the first channel determined in step (k) is link down, returning to step (a). Implementations comprise (d) after step (c), waiting for the link status of the second channel to change to link up; and (e) after step (d), and after the link status of the second channel changes to link up, stopping forcing the link status of the first channel to link down. Implementations comprise (d) after step (d), waiting for the link status of the first channel to change to link up; and (e) after step (d), and after the link status of the first channel changes to link up, stopping forcing the link status of the second channel to link down. Implementations comprise asserting an error indicator for the second channel after step (c); and clearing the error indicator for the second channel after step (d). Implementations comprise asserting an error indicator for the first channel after step (e). Implementations comprise asserting an error indicator for the first channel after step (e); and clearing the error indicator for the second channel after step (d).

In general, in one aspect, the invention features an apparatus for controlling the link status of first and second data communication channels. It comprises a first physical layer device coupled to the first channel, the first physical layer device comprising a first register storing a first link status bit that indicates the link status of the first channel; and a second physical layer device coupled to the second channel, the second physical layer device comprising a second register storing a second link status bit that indicates the link status of the second channel; wherein the first and second physical layer devices are configured to pass data between the first and second channels; and a processor to (a) determine the link status of the first channel; (b) when the link status of the first channel determined at (a) is link up, determine the link status of the second channel; and (c) when the link status of the second channel determined at (b) is link down, automatically force the link status of the first channel to link down.

Particular implementations can include one or more of the following features. The processor (d) when the link status of the second channel determined at (b) is link up, determines the link status of the first channel; and (e) when the link status of the first channel determined at (d) is link down, automatically forces the link status of the second channel to link down. The processor (f) when the link status of the first channel determined at (d) is link up, determines the link status of the second channel; and (g) when the link status of the second channel determined at (f) is link down, automatically forces the link status of the first channel to link down. The processor (h) when the link status of the second channel determined at (f) is link up, returns to (d). The processor (i) when the link status of the second channel determined at (f) is link down, returns to (a) after automatically forcing the link status of the first channel to link down. The processor (j) when the link status of the second channel determined at (b) is link down, returns to (a) after automatically forcing the link status of the first channel to link down. The processor (k) when the link status of the first channel determined at (a) is link down, determines the link status of the second channel; (l) when the link status of the second channel determined at (k) is link up, determines the link status of the first channel; and (m) when the link status of the first channel determined at (l) is link down, automatically forces the link status of the second channel to link down. The processor (n) when the link status of the first channel determined at (k) is link up and the link status of the second channel determined at (b) is link up, determines the link status of the first channel; and (o) when the link status of the first channel determined at (n) is link down, automatically forces the link status of the second channel to link down. The processor (p) when the link status of the first channel determined at (d) is link down, returns to (a) after automatically forcing the link status of the second channel to link down. The processor (q) when the link status of the first channel determined at (l) is link down, returns to (a) after automatically forcing the link status of the second channel to link down. The processor (r) when the link status of the first channel determined at (k) is link down, returns to (a). The processor (d) after (c), waits for the link status of the second channel to change to link up; and (e) after (d), and after the link status of the second channel changes to link up, stops forcing the link status of the first channel to link down. The processor (d) after (d), waits for the link status of the first channel to change to link up; and (e) after (d), and after the link status of the first channel changes to link up, stops forcing the link status of the second channel to link down. The processor asserts an error indicator for the second channel after (c); and clears the error indicator for the second channel after (d). The processor asserts an error indicator for the first channel after (e); and clears the error indicator for the second channel after (d).

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Figure 2:
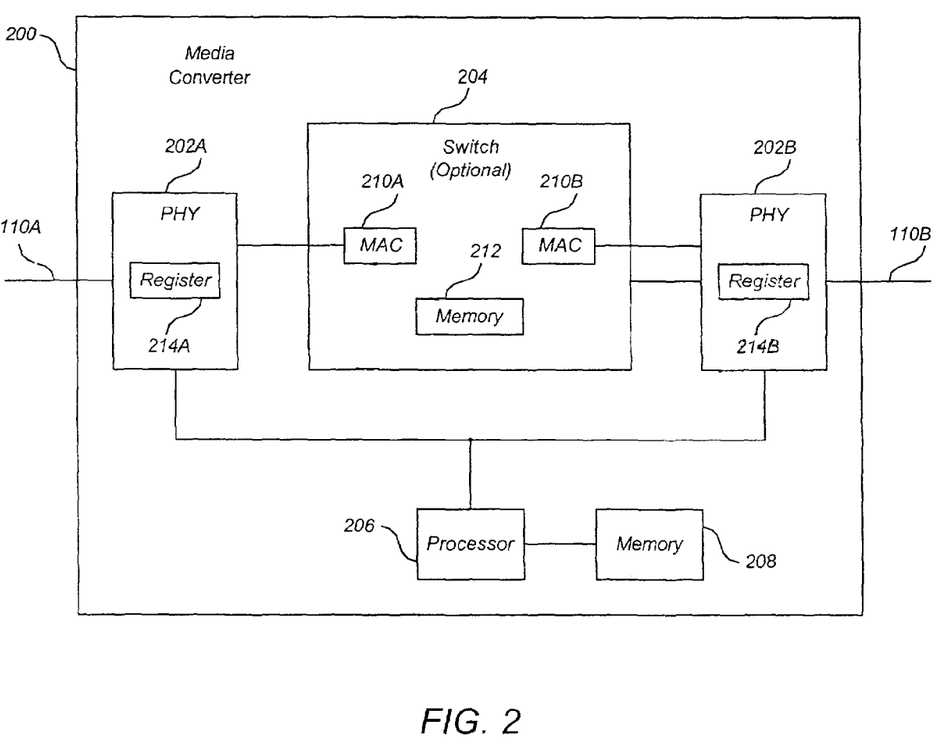
FIG. 2 shows a media converter that can be used in place of one or both of the media converters of FIG. 1, according to one embodiment.

FIG. 2 shows a media converter 200 that can be used in place of one or both of media converters 108 of FIG. 1, according to one embodiment. Media converter 200 connects two channels 110A and 110B, which can be of the same media or of different media. Channels 110A and 110B are connected to physical layer devices (PHY) 202A and 202B respectively. PHYs 202 are connected to an optional switch 204. If channels 110A and 110B are of the same media and speed, switch 204 is not necessary, and PHYs 202 are connected directly to each other. Switch 204 comprises a memory 212 and media access controllers (MAC) 210A and 210B, which are connected to PHYs 202A and 202B, respectively.

Switch 202 also comprises a processor 206 and a memory 208. In some embodiments, memory 208 is implemented as a serial electrically-erasable programmable read-only memory (EEPROM) for easy replacement. In other embodiments, memory 208 and memory 212 are implemented together as random access memory (RAM). Media converter 108 can be implemented as one or more integrated circuits.

PHYs 202A and 202B comprise registers 214A and 214B, respectively. The register 214 in a PHY 202 stores three bits referred to herein as a latched-low link status bit, a real-time link status bit, and a break link bit.

The latched-low link status bit operates according to the 802.3 standard published by the Institute of Electrical and Electronics Engineers (IEEE). That is, the bit is set to high when read, and is latched low whenever the link status of the link 110 attached to the PHY 202 goes to "link down." Thus if the latched-low link status bit is low when read, a "link down" condition has occurred at some point after the previous read of the bit.

The real-time link status bit indicates the real-time link status of the channel 110 connected to the PHY 202. For example, the bit is set when the link status is "link up" and is reset when the link status is "link down." In the processes described below, the real-time link status bit is sometimes tested to determine real-time link status. In alternative embodiments, no real-time link status bit is employed, and real-time link status is instead determined using the latched-low link status bit, for example by reading the bit once to clear the latched bit, and then reading the bit again to determine the real-time status.

The break link bit is a control bit that, when set by processor 206, causes the PHY 202 to force a "link down" condition on its channel 110, for example by powering down the PHY 202. In a preferred embodiment, processor 206 communicates with PHYs 202 using the TREE system management interface (SMI).

Figure 3:
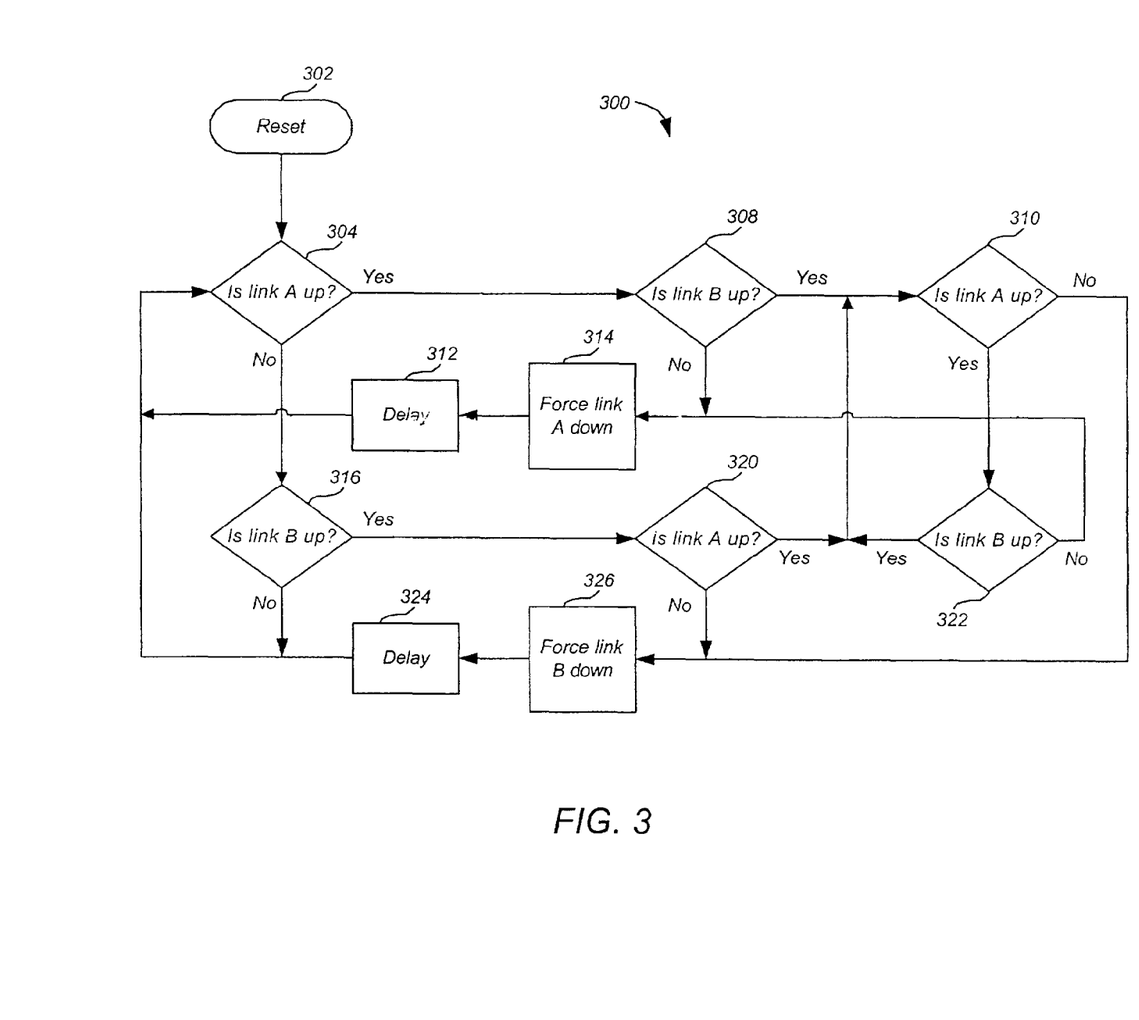
FIG. 3 depicts a process performed by a processor according to one embodiment when the media converter of FIG. 2 replaces the media converter in FIG. 1.

FIG. 3 depicts a process 300 performed by processor 206 according to one embodiment when media converter 200 replaces media converter 108A in FIG. 1. In FIG. 3, channel 110A is referred to as "link A," and channel 110B is referred to as "link B." Process 300 begins when converter 108A is reset (step 302). Processor 206 determines whether link A is up (that is, whether link A has a link status of "link up"-step 304). In a preferred embodiment, processor 206 makes this determination by reading the real-time link status bit in the PHY register 214 for link A. If link A is up, processor 206 determines whether link B is up (step 308). In a preferred embodiment, processor 206 makes this determination by reading the real-time link status bit in the PHY register 214 for link B. If link B is down (that is, link B has a link status of "link down") then processor 206 forces link A down (that is, changes the link status of link A to "link down"—step 314), thereby propagating the link status of link A to link B. In a preferred embodiment, processor 206 forces a link down by setting the link bit in the PHY register 214 for that link. Of course, other methods can be used to force a "link down" condition. Then, after a predetermined interval (step 312), processor 206 returns to step 304. The interval at step 312 is selected to allow time for the link partner (here media converter 108B) to detect the "link down" condition. Of course, other delays can be added to process 300 where needed to allow time for signals and conditions to propagate and the like.

But if in step 308 link B is up, processor 206 determines whether link A is still up (step 310). In a preferred embodiment, processor 206 makes this determination by reading the latched-low link status bit in the PHY register 214 for link A. If so, then processor 206 again tests whether link B is up (step 322). In a preferred embodiment, processor 206 makes this determination by reading the latched-low link status bit in the PHY register 214 for link B. As long as both links A and B remain up, process 300 repeats steps 310 and 322. If link B goes down (step 322), processor 206 forces link A down (step 314), and after a predetermined interval (step 312), process 300 returns to step 304. Similarly, if link A goes down (step 310), processor 206 forces link B down (step 326), and after a predetermined interval (step 324), returns to step 304. The predetermined interval of step 324 is selected similarly to that in step 312.

If in step 304 link A is down, processor 206 determines whether link B is up (step 316). In a preferred embodiment, processor 206 makes this determination by reading the real-time link status bit in the PHY register 214 for link B. If not, process 300 returns to step 304. As long as both links A and B remain down, process 300 repeats steps 304 and 316. But if link B goes up, processor 206 determines whether link A is up (step 320). In a preferred embodiment, processor 206 makes this determination by reading the real-time link status bit in the PHY register 214 for link A. If link A is down then processor 206 forces link B down (step 326), thereby propagating the link status of link B to link A. Then, after a predetermined interval (step 324), processor 206 returns to step 304. But if in step 320 link A is up, process 300 returns to step 310.

Process 300 constantly tries to bring the links up. This allows the links to be restored without the need of human intervention. But a link that constantly goes up and down can cause problems in networks that try to re-configure themselves by switching over to a backup link when a primary link goes down. Process 300 is optimized for low cost, simple (i.e., non-redundant) networks. It is easy to determine the link segment where the real "link down" is by looking at the local link indicators. If both link indicators are blinking, both local links are OK and the real "link down" problem is at the far end. If one of the local links is always off (not blinking) then the real "link down" is on that port.

Figure 4:
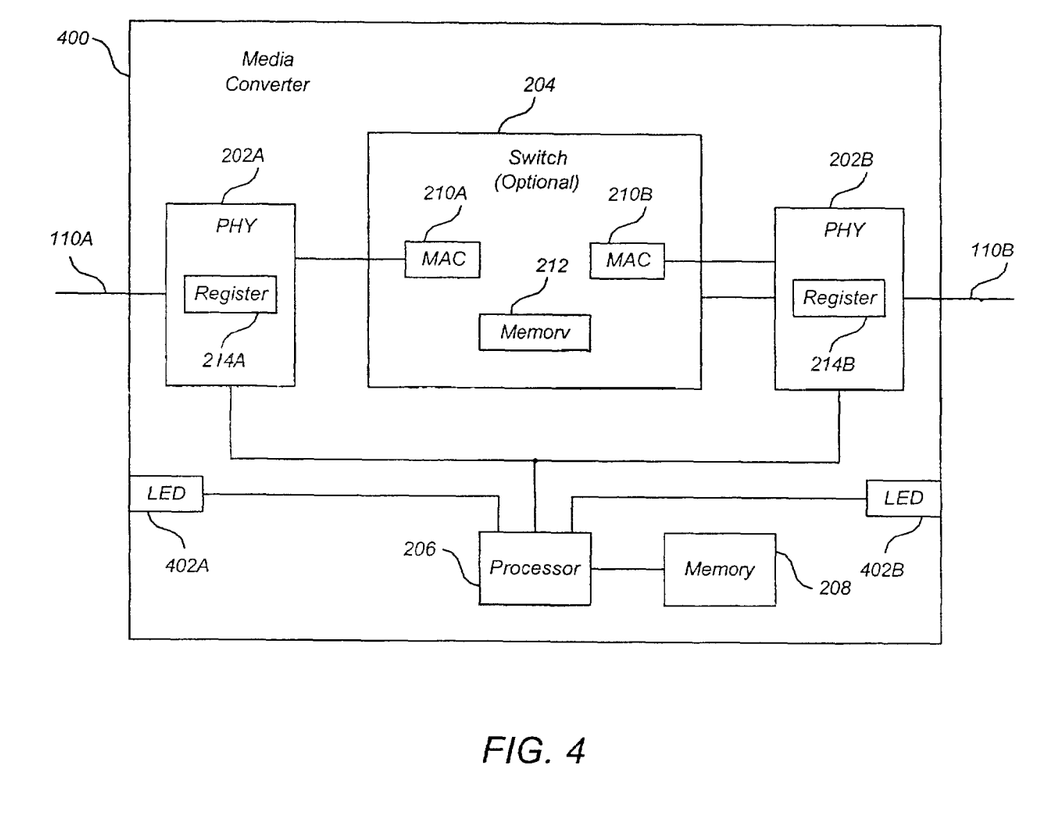
FIG. 4 shows a media converter that can be used in place of one or both of the media converters of FIG. 1, according to another embodiment.

FIG. 4 shows a media converter 400 that can be used in place of one or both of media converters 108 of FIG. 1, according to another embodiment. Media converter 400 differs from media converter 200 of FIG. 2 in the process performed by processor 206, and in that media converter 200 optionally includes a error indicator 402, such as a light-emitting diodes (LED), for each link. When processor 206 detects that a link has gone down, it asserts the error indicator 402 for that link. When processor 206 subsequently detects that the link has come up, it clears the error indicator 402 for that link. By visual inspection of the LEDs, a technician can determine which of the links connected to a media converter 200 caused a fault.

Figure 5:
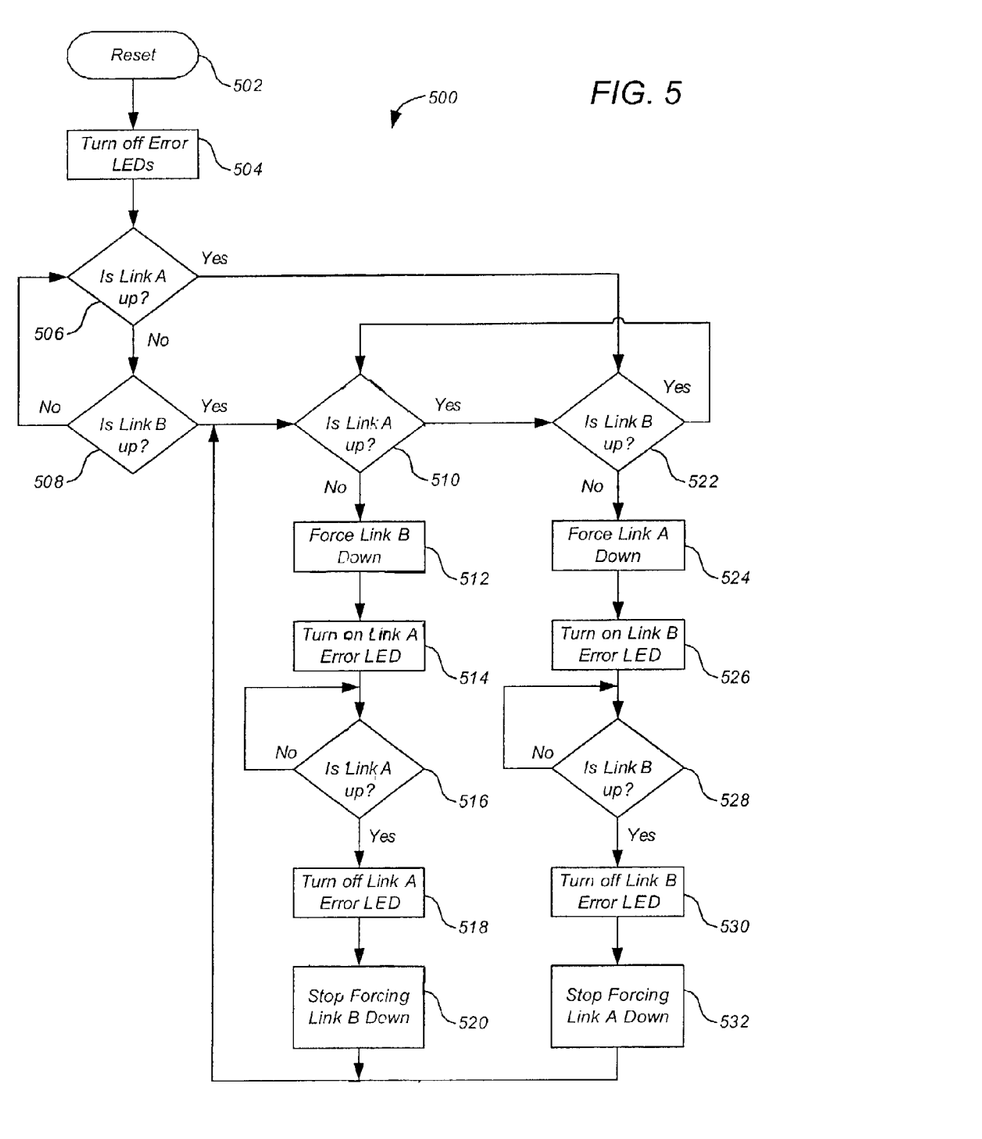
FIG. 5 depicts a process performed by a processor according to one embodiment when the media converter of FIG. 4 replaces the media converter in FIG. 1.

FIG. 5 depicts a process 500 performed by processor 206 according to one embodiment when replacing media converter 108A in FIG. 1. In FIG. 5, channel 110A is referred to as "link A," and channel 110B is referred to as "link B." Process 500 begins when converter 108A is reset (step 502). Processor 206 turns off both error LEDs 402 (step 504). Processor 206 then determines whether link A is up (that is, whether link A has a link status of "link up"—step 506). In a preferred embodiment, processor 206 makes this determination by reading the real-time link status bit in the PHY register 214 for link A. If link A is up, processor 206 determines whether link B is up (step 522). In a preferred embodiment, processor 206 makes this determination by reading the latched-low link status bit in the PHY register 214 for link B. If link B is down (that is, link B has a link status of "link down") then processor 206 forces link A down (step 524), thereby propagating the link status of link B to link A. In a preferred embodiment, processor 206 forces a link down by setting the break link bit in, the PHY register 214 for that link. Of course, other methods can be used to force a "link down" condition. Processor 206 then turns on the error LED 402B for link B, thereby indicating that the fault lies with link B (step 526).

Processor 206 then waits until link B comes up again (step 528). In a preferred embodiment, processor 206 makes this determination by reading the real-time link status bit in the PHY register 214 for link B. When link B comes up again, processor 206 turns off the link B error LED 402B (step 530) and stops forcing link A down (step 532). In a preferred embodiment, processor 206 stops forcing a link down by resetting the break link bit in the PHY register 214 for the PHY 202 connected to that link. Of course, other methods can be used. Process 500 then resumes at step 510, as described below.

If in step 506 link A is down, then processor 206 determines whether link B is up (step 508). In a preferred embodiment, processor 206 makes this determination by reading the real-time link status bit in the PHY register 214 for link B. If link B is down, then process 500 returns to step 506. As long as both links A and B remain down, process 500 repeats steps 506 and 508 so that no error LED is turned on.

But if in step 508 link B is up, processor 206 determines whether link A is up (step 510). In a preferred embodiment, processor 206 makes this determination by reading the latched-low link status bit in the PHY register 214 for link A. If link A is up, then process 500 resumes at step 522, as described above.

If in step 510 link A is down, then processor 206 forces link B down (step 512), thereby propagating the link status of link A to link B. Processor 206 then turns on the error LED 402A for link A, thereby indicating that the fault lies with link A (step 514).

Processor 206 then waits until link A comes up again (step 516). In a preferred embodiment, processor 206 makes this determination by reading the real-time link status bit in the PHY register 214 for link A. When link A comes up again, processor 206 turns off the link A error LED 402B (step 518) and stops forcing link B down (step 520). Process 500 then resumes at step 510, as described above.

Of course, delays can be added to process 500 where needed to allow time for signals and conditions to propagate and the like.

Process 500 is optimized for networks with redundant links where a backup link takes over when a primary link goes down. Process 500 keeps the links down until the problem link is restored. This "one-time-down" approach prevents the network from constantly re-configuring until the problem link is restored. The error LED is added to identify the problem link so the problem can be isolated. Without the error LED it would be difficult to isolate the link segment where the error occurred.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Process 500 can be implemented without an error LED. Process 300 and process 500 can be contained in one implementation such that the desired process could be user selected. Accordingly, other implementations are within the scope of the following claims.

What is claimed is:

1. A method for controlling a link status of first and second data communication channels configured to exchange data through a media converter, comprising:
   (a) determining the link status of the first channel;
   (b) when the link status of the first channel determined in step (a) is link up, determining the link status of the second channel; and
   (c) when the link status of the second channel determined in step (b) is link down, automatically forcing the link status of the first channel to link down.

2. The method of claim 1, further comprising:
   (d) when the link status of the second channel determined in step (b) is link up, determining the link status of the first channel; and
   (e) when the link status of the first channel determined in step (d) is link down, is automatically forcing the link status of the second channel to link down.

3. The method of claim 2, further comprising:
   (f) when the link status of the first channel determined in step (d) is link up, determining the link status of the second channel; and
   (g) when the link status of the second channel determined in step (f) is link down, automatically forcing the link status of the first channel to link down.

4. The method of claim 3, further comprising:
   (h) when the link status of the second channel determined in step (f) is link up, returning to step (d).

5. The method of claim 3, further comprising:
   (i) when the link status of the second channel determined in step (f) is link down, returning to step (a) after automatically forcing the link status of the first channel to link down.

6. The method of claim 1, further comprising:
   (j) when the link status of the second channel determined in step (b) is link down, returning to step (a) after automatically forcing the link status of the first channel to link down.

7. The method of claim 1, further comprising:
   (k) when the link status of the first channel determined in step (a) is link down, determining the link status of the second channel;
   (l) when the link status of the second channel determined in step (k) is link up, determining the link status of the first channel; and
   (m) when the link status of the first channel determined in step (l) is link down, automatically forcing the link status of the second channel to link down.

8. The method of claim 7, further comprising:
   (n) when the link status of the first channel determined in step (k) is link up and the link status of the second channel determined in step (b) is link up, determining the link status of the first channel; and
   (o) when the link status of the first channel determined in step (n) is link down, automatically forcing the link status of the second channel to link down.

9. The method of claim 7, further comprising:
   (p) when the link status of the first channel determined in step (d) is link down, returning to step (a) after automatically forcing the link status of the second channel to link down.

10. The method of claim 9, further comprising:
    (q) when the link status of the first channel determined in step (l) is link down, returning to step (a) after automatically forcing the link status of the second channel to link down.

11. The method of claim 7, further comprising:
(r) when the link status of the first channel determined in step (k) is link down, returning to step (a).

12. The method of claim 1, further comprising:
(d) after step (c), waiting for the link status of the second channel to change to link up; and
(e) after step (d), and after the link status of the second channel changes to link up, stopping forcing the link status of the first channel to link down.

13. The method of claim 2, further comprising:
(f) after step (d), waiting for the link status of the first channel to change to link up; and
(g) after step (f), and after the link status of the first channel changes to link up, stopping forcing the link status of the second channel to link down.

14. The method of claim 1, further comprising:
asserting an error indicator for the second channel after step (c).

15. The method of claim 12, further comprising:
asserting an error indicator for the second channel after step (c); and
clearing the error indicator for the second channel after step (d).

16. The method of claim 2, further comprising:
asserting an error indicator for the first channel after step (e).

17. The method of claim 13, further comprising:
asserting an error indicator for the first channel after step (e); and
clearing the error indicator for the second channel after step (f).

18. A non-transitory computer-readable media embodying instructions executable by a computer to perform a method for controlling a link status of first and second data communication channels configured to exchange data through a media converter, the method comprising:
(a) determining the link status of the first channel;
(b) when the link status of the first channel determined in step (a) is link up, determining the link status of the second channel; and
(c) when the link status of the second channel determined in step (b) is link down, automatically forcing the link status of the first channel to link down.

19. The media of claim 18, wherein the method further comprises:
(d) when the link status of the second channel determined in step (b) is link up, determining the link status of the first channel; and
(e) when the link status of the first channel determined in step (d) is link down, automatically forcing the link status of the second channel to link down.

20. The media of claim 19, wherein the method further comprises:
(f) when the link status of the first channel determined in step (d) is link up, determining the link status of the second channel; and
(g) when the link status of the second channel determined in step (f) is link down, automatically forcing the link status of the first channel to link down.

21. The media of claim 20, wherein the method further comprises:
(h) when the link status of the second channel determined in step (f) is link up, returning to step (d).

22. The media of claim 20, wherein the method further comprises:
(i) when the link status of the second channel determined in step (f) is link down, returning to step (a) after automatically forcing the link status of the first channel to link down.

23. The media of claim 18, wherein the method further comprises:
(j) when the link status of the second channel determined in step (b) is link down, returning to step (a) after automatically forcing the link status of the first channel to link down.

24. The media of claim 18, wherein the method further comprises:
(k) when the link status of the first channel determined in step (a) is link down, determining the link status of the second channel;
(l) when the link status of the second channel determined in step (k) is link up, determining the link status of the first channel; and
(m) when the link status of the first channel determined in step (l) is link down, automatically forcing the link status of the second channel to link down.

25. The media of claim 24, wherein the method further comprises:
(n) when the link status of the first channel determined in step (k) is link up and the link status of the second channel determined in step (b) is link up, determining the link status of the first channel; and
(o) when the link status of the first channel determined in step (n) is link down, automatically forcing the link status of the second channel to link down.

26. The media of claim 24, wherein the method further comprises:
(p) when the link status of the first channel determined in step (d) is link down, returning to step (a) after automatically forcing the link status of the second channel to link down.

27. The media of claim 26, wherein the method further comprises:
(q) when the link status of the first channel determined in step (l) is link down, returning to step (a) after automatically forcing the link status of the second channel to link down.

28. The media of claim 24, wherein the method further comprises:
(r) when the link status of the first channel determined in step (k) is link down, returning to step (a).

29. The media of claim 18, wherein the method further comprises:
(d) after step (c), waiting for the link status of the second channel to change to link up; and
(e) after step (d), and after the link status of the second channel changes to link up, stopping forcing the link status of the first channel to link down.

30. The media of claim 19, wherein the method further comprises:
(f) after step (d), waiting for the link status of the first channel to change to link up; and
(g) after step (f), and after the link status of the first channel changes to link up, stopping forcing the link status of the second channel to link down.

31. The media of claim 18, wherein the method further comprises:
asserting an error indicator for the second channel after step (c).

32. The media of claim 29, wherein the method further comprises:
asserting an error indicator for the second channel after step (c); and
clearing the error indicator for the second channel after step (d).

33. The media of claim 19, wherein the method further comprises:
asserting an error indicator for the first channel after step (e).

34. The media of claim 30, wherein the method further comprises:
asserting an error indicator for the first channel after step (e); and
clearing the error indicator for the second channel after step (f).

35. An apparatus for controlling a link status of first and second data communication channels, comprising:
a first physical layer device coupled to the first channel, the first physical layer device comprising a first register storing a first link status bit that indicates the link status of the first channel; and
a second physical layer device coupled to the second channel, the second physical layer device comprising a second register storing a second link status bit that indicates the link status of the second channel;
wherein the first and second physical layer devices are configured to pass data between the first and second channels; and
a hardware processor to
(a) determine the link status of the first channel;
(b) when the link status of the first channel determined at (a) is link up, determine the link status of the second channel; and
(c) when the link status of the second channel determined at (b) is link down, automatically force the link status of the first channel to link down.

36. The apparatus of claim 35, wherein the processor
(d) when the link status of the second channel determined at (b) is link up, determines the link status of the first channel; and
(e) when the link status of the first channel determined at (d) is link down, automatically forces the link status of the second channel to link down.

37. The apparatus of claim 36, wherein the processor
(f) when the link status of the first channel determined at (d) is link up, determines the link status of the second channel; and
(g) when the link status of the second channel determined at (f) is link down, automatically forces the link status of the first channel to link down.

38. The apparatus of claim 37, wherein the processor
(h) when the link status of the second channel determined at (f) is link up, returns to (d).

39. The apparatus of claim 37, wherein the processor
(i) when the link status of the second channel determined at (f) is link down, returns to (a) after automatically forcing the link status of the first channel to link down.

40. The apparatus of claim 35, wherein the processor
(j) when the link status of the second channel determined at (b) is link down, returns to (a) after automatically forcing the link status of the first channel to link down.

41. The apparatus of claim 35, wherein the processor
(k) when the link status of the first channel determined at (a) is link down, determines the link status of the second channel;
(l) when the link status of the second channel determined at (k) is link up, determines the link status of the first channel; and
(m) when the link status of the first channel determined at (l) is link down, automatically forces the link status of the second channel to link down.

42. The apparatus of claim 41, wherein the processor
(n) when the link status of the first channel determined at (k) is link up and the link status of the second channel determined at (b) is link up, determines the link status of the first channel; and
(o) when the link status of the first channel determined at (n) is link down, automatically forces the link status of the second channel to link down.

43. The apparatus of claim 41, wherein the processor
(p) when the link status of the first channel determined at (d) is link down, returns to (a) after automatically forcing the link status of the second channel to link down.

44. The apparatus of claim 43, wherein the processor
(q) when the link status of the first channel determined at (l) is link down, returns to (a) after automatically forcing the link status of the second channel to link down.

45. The apparatus of claim 41, wherein the processor
(r) when the link status of the first channel determined at (k) is link down, returns to (a).

46. The apparatus of claim 35, wherein the processor
(d) after (c), waits for the link status of the second channel to change to link up; and
(e) after (d), and after the link status of the second channel changes to link up, stops forcing the link status of the first channel to link down.

47. The apparatus of claim 36, wherein the processor
(f) after (d), waits for the link status of the first channel to change to link up; and
(g) after (f), and after the link status of the first channel changes to link up, stops forcing the link status of the second channel to link down.

48. The apparatus of claim 35, wherein the processor asserts an error indicator for the second channel after (c).

49. The apparatus of claim 46, wherein the processor
asserts an error indicator for the second channel after (c); and
clears the error indicator for the second channel after (d).

50. The apparatus of claim 36, wherein the processor asserts an error indicator for the first channel after (e).

51. The apparatus of claim 47, wherein the processor
asserts an error indicator for the first channel after (e); and
clears the error indicator for the second channel after (f).

52. An apparatus for controlling a link status of first and second data communication channels, comprising:
a first physical layer means for exchanging data with the first channel, the first physical layer means comprises first register means storing a first link status bit that indicates the link status of the first channel; and
a second physical layer means for exchanging data with the second channel, the second physical layer means comprises second register means storing a second link status bit that indicates the link status of the second channel;
wherein the first and second physical layer means pass data between the first and second channels; and
a hardware processor means for
(a) determining the link status of the first channel;
(b) when the link status of the first channel determined at (a) is link up, determining the link status of the second channel; and (c) when the link status of the second channel determined at (b) is link down, automatically forcing the link status of the first channel to link down, wherein the physical layer means and the second physical layer means are executed by the hardware processor.

53. The apparatus of claim 52, wherein the processor means (d) when the link status of the second channel determined at (b) is link up, determines the link status of the first channel; and (e) when the link status of the first channel determined at (d) is link down, automatically forces the link status of the second channel to link down.

54. The apparatus of claim 53, wherein the processor means (f) when the link status of the first channel determined at (d) is link up, determines the link status of the second channel; and (g) when the link status of the second channel determined at (f) is link down, automatically forces the link status of the first channel to link down.

55. The apparatus of claim 54, wherein the processor means (h) when the link status of the second channel determined at (f) is link up, returns to (d).

56. The apparatus of claim 54, wherein the processor means (i) when the link status of the second channel determined at (f) is link down, returns to (a) after automatically forcing the link status of the first channel to link down.

57. The apparatus of claim 52, wherein the processor means (j) when the link status of the second channel determined at (b) is link down, returns to (a) after automatically forcing the link status of the first channel to link down.

58. The apparatus of claim 52, wherein the processor means (k) when the link status of the first channel determined at (a) is link down, determines the link status of the second channel;

(l) when the link status of the second channel determined at (k) is link up, determines the link status of the first channel; and (m) when the link status of the first channel determined at (l) is link down, automatically forces the link status of the second channel to link down.

59. The apparatus of claim 58, wherein the processor means (n) when the link status of the first channel determined at (k) is link up and the link status of the second channel determined at (b) is link up, determines the link status of the first channel; and (o) when the link status of the first channel determined at (n) is link down, automatically forces the link status of the second channel to link down.

60. The apparatus of claim 58, wherein the processor means (p) when the link status of the first channel determined at (d) is link down, returns to (a) after automatically forcing the link status of the second channel to link down.

61. The apparatus of claim 60, wherein the processor means (q) when the link status of the first channel determined at (l) is link down, returns to (a) after automatically forcing the link status of the second channel to link down.

62. The apparatus of claim 58, wherein the processor means (r) when the link status of the first channel determined at (k) is link down, returns to (a).

63. The apparatus of claim 52, wherein the processor means (d) after (c), waits for the link status of the second channel to change to link up; and (e) after (d), and after the link status of the second channel changes to link up, stops forcing the link status of the first channel to link down.

64. The apparatus of claim 53, wherein the processor means (f) after (d), waits for the link status of the first channel to change to link up; and (g) after (f), and after the link status of the first channel changes to link up, stops forcing the link status of the second channel to link down.

65. The apparatus of claim 52, wherein the processor means asserts an error indicator for the second channel after (c).

66. The apparatus of claim 63, wherein the processor means asserts an error indicator for the second channel after (c); and clears the error indicator for the second channel after (d).

67. The apparatus of claim 53, wherein the processor means asserts an error indicator for the first channel after (e).

68. The apparatus of claim 64, wherein the processor means asserts an error indicator for the first channel after (e); and
clears the error indicator for the second channel after (f).

* * * * *